Figure 1:
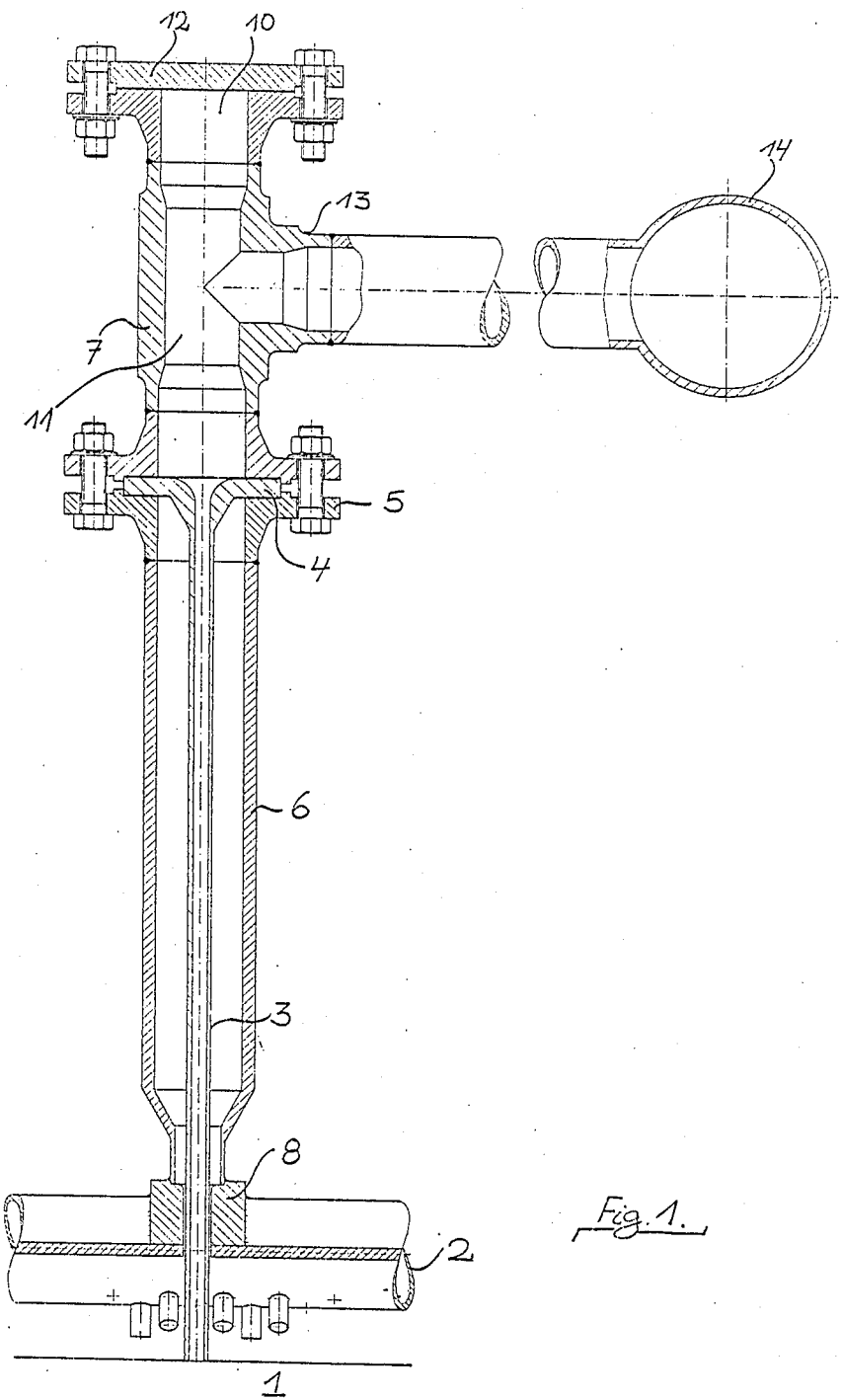

United States Patent [19]

Keller

[11] Patent Number: 4,848,248
[45] Date of Patent: Jul. 18, 1989

[54] TUYERE FOR THE INTRODUCTION OF A REACTION MEDIUM INTO A HOT GAS

[75] Inventor: Paul Keller, Olpe, Fed. Rep. of Germany

[73] Assignee: L. & C. Steinmuller GmbH, Gummersbach, Fed. Rep. of Germany

[21] Appl. No.: 147,309

[22] Filed: Jan. 22, 1988

[30] Foreign Application Priority Data

Jan. 29, 1987 [DE] Fed. Rep. of Germany ....... 3702561

[51] Int. Cl.$^4$ ................................................ F23L 5/00
[52] U.S. Cl. .................................. 110/182.5; 122/6.6
[58] Field of Search ............................ 122/6.5, 6.6.6.4; 110/182.5

[56] References Cited

U.S. PATENT DOCUMENTS 3,875,904  4/1975  Astrom ...................... 110/182.5 X
3,900,011  8/1975  Stenlumd .................... 110/182.5 X
4,437,415  3/1984  Spielman ...................... 122/6.6 X

FOREIGN PATENT DOCUMENTS 0070799  9/1985  European Pat. Off. .
842210   6/1952  Fed. Rep. of Germany .

Primary Examiner—Edward G. Favors
Attorney, Agent, or Firm—Young & Thompson

[57] ABSTRACT

The tuyere (3) is clamped in place with its inlet end by way of an integrally formed flange (4) in a flange connection (5) of a pipe adapter (6) attached to the wall (2) on the outside, and a pipe connection (7), the outlet end of this tuyere being freely extended through the wall (2) up into the chamber (1) traversed by the flow. The primary field of application is the use of the tuyere in the treatment of hot flue gas having a temperature of 700° to 1100° C. with a reducing agent for decreasing nitrogen oxides.

2 Claims, 2 Drawing Sheets

TUYERE FOR THE INTRODUCTION OF A REACTION MEDIUM INTO A HOT GAS

The invention relates to a tuyere for the introduction of a gaseous or liquid reaction medium into a hot gas flowing through a space defined by walls.

Such a tuyere has been known from DOS 2,550,635. A gaseous or liquid reducing agent, for example ammonia or an ammonia precursor, is introduced by way of this conventional tuyere into flue gas having a temperature of 700° C. to 1100° C. in order to diminish the nitrogen oxides contained in the flue gas and representing environmental pollutants. The addition of the reducing agent takes place via a plurality of such tuyeres, with the objective of a maximally uniform intermixing of the reducing agent with the hot gas to be treated and a most extensively complete reduction of the nitrogen oxides to nitrogen. The pipe nozzles are arranged in such a way that the reducing agent is distributed with maximum uniformity over the cross section of the hot gas flow. In this arrangement, the nozzles can be located in a single cross-sectional area as well as in several cross-sectional areas and/or in a different cross-section zone. All nozzles herein extend in respectively differing positions. In order to protect from excessive thermal stress and to prevent premature thermal decomposition of the reducing agent exiting from the tuyeres, the nozzles and their feed conduit are preferably surrounded by a heat shield, for example a cooling jacket traversed by water or steam, or a layer of refractory material.

The costs of construction, wherein also static viewpoints must be considered besides thermal ones, are accordingly very high. Therefore, in certain applications, the use of such tuyeres may appear questionable for economical reasons.

The invention is based on the object of developing a tuyere which is arranged outside of the hot gas flow, without an impairment in the uniform distribution of the reducing agent to be admixed into the hot gas stream.

The object has been attained by providing that the tuyere is clamped in place with its inlet end by way of an integrally formed flange in a flange connection of a pipe adapter, mounted to the wall on the outside, and a pipe connection, the outlet end of the tuyere being freely extended through the wall to the space traversed by the flow.

This structural solution offers various advantages. The unilateral fastening of the tuyere by clamping action in the flange connection existing between the pipe adapter and the pipe connection makes it possible for the tuyere to be installed and dismounted in a relatively simple way for servicing purposes. In this context, the flange connection can be established by threaded connection, by clips, or by similar detachable means. The unilateral mounting of the tuyere at its inlet end makes it furthermore possible for the inlet end to freely expand in the direction of the gas-traversed space, caused by increased temperatures prevailing without fail in the wall zone of the hot gas having a temperature of 700° C. to 1100° C., especially 850° C. to 1100° C.. The length of the tuyere is dimensioned so that its outlet opening comes to lie substantially in the surface of the inner wall. In order to ensure free expansibility, the bore provided in the wall is in all cases larger than the outer diameter of the tuyere.

The pipe adapter can be attached, for example, either to a metal wall, tamped or not tamped on the gas side, or to a masonry wall on the outside, i.e. on the wall surface facing away from the hot gas. The mounting of the pipe adapter to the metal wall frequently is accomplished by way of a gastight weld connection. The gastight welding of pipe adapters to a wall designed as a tubular membrane or finned wall is, however, accompanied by considerable difficulties in most cases. Thus, special care must be exercised during the production of the welding bond in the zone of the finned-pipe webs, in particular.

In order to ensure a gastight welding connection between the pipe adapter and the wall, it is advantageous to connect the pipe adapter to the wall designed as a tubular membrane or finned wall by way of a weld joint flush with the wall surface and provided with a bore.

The use of a weld joint, the shape of which adapts itself to the wall surface defined by finned tubes ensures, on account of easier access to the connecting points, flawlessly gastight weld connections at the membrane or finned pipe wall as well as toward the pipe adapter.

It is especially advantageous to make the pipe adapter smaller in diameter at the connection to the weld joint than at the flange connection. The cross-sectional tapering of the pipe adapter makes it possible to establish a weld bond between the pipe adapter and the weld joint which is adapted to the size of the weld joint and is independent of the remaining diameter of the pipe adapter.

It is furthermore expedient to give the pipe connection the shape of a T, the one pipe opening of the T-beam being located at the flange connection, while the other pipe opening, in opposition to the tuyere on the same axis, is closed off by a removable lid, and wherein the pipe section extending away at an angle of 90° with respect to the axis of the tuyere is joined to a feed conduit.

The use of a pipe connection having the form of a "T", one opening of which is sealed by a lid and/or a blind flange, makes it possible, by removing the lid, to inspect and service the tuyere at any time even in the installed condition.

Figure 2:
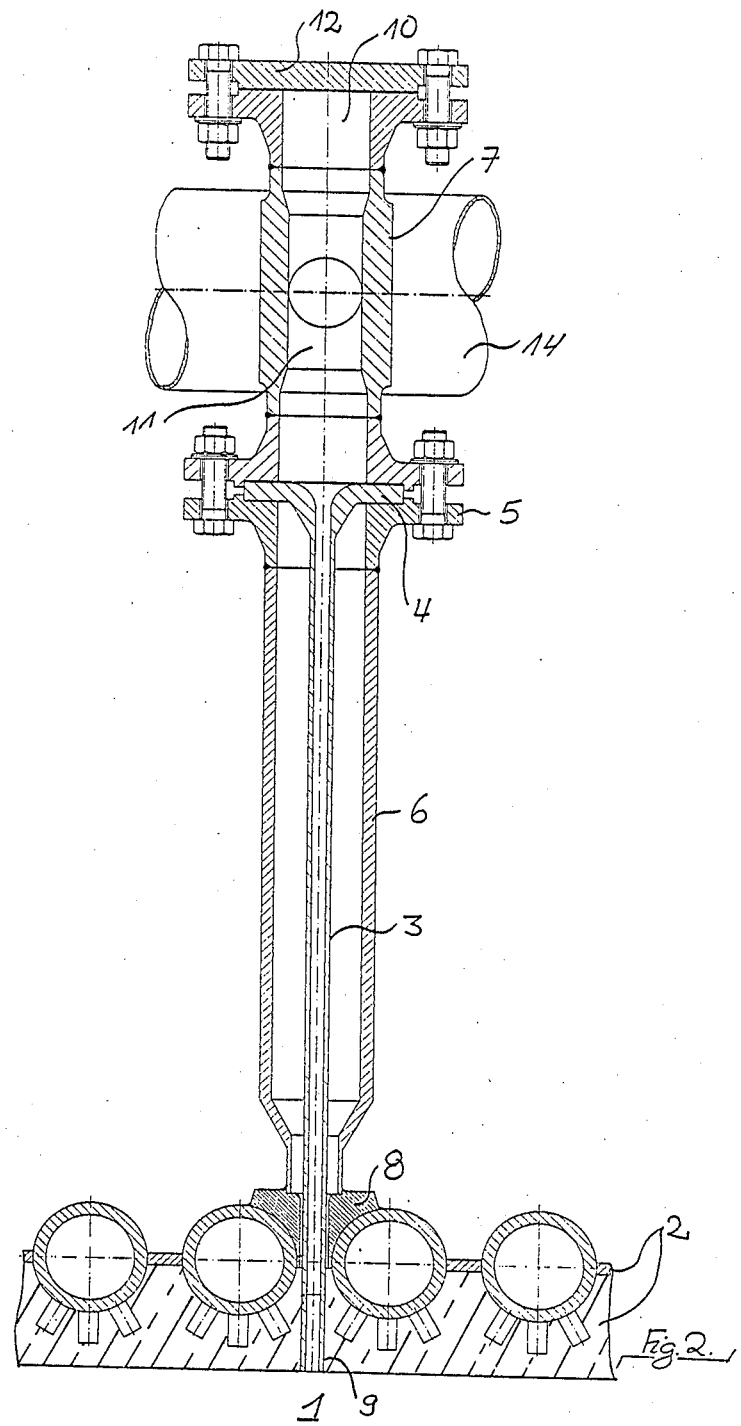

The invention will be described in greater detail below with reference to the appended figures wherein:

FIG. 1 shows an elevational view of one embodiment of the tuyere according to this invention, and FIG. 2 is an elevational view of the tuyere rotated by 90° with respect to FIG. 1.

According to FIGS. 1 and 2, at least one tuyere 3 is arranged in a chamber 1 traversed by flowing hot flue gas, for example a combustion chamber or a flue gas duct of a furnace, in a zone where the flue gas exhibits a temperature of about 700° C. to 1100° C., especially 850° C. to 1100° C., at a wall 2 designed as a membrane or finned pipe wall and lined with a refractory tamping material.

The tuyere 3 employed can be a nozzle with a cylindrical, conical, flat, de-Laval type, or differently shaped outlet orifice, with or without swirl production.

Each tuyere 3 is clamped in place with its inlet end via an integrally formed flange 4 in a flange coupling 5 of a pipe adapter 6 attached to the wall 2 on the outside, and a pipe connection 7, the outlet end of the tuyere being freely extended through the wall 2 up into the chamber 1 traversed by the flowing gas. In the wall 2, constructed as a tubular membrane or finned wall, the pipe adapter 6 is connected by way of a weld joint 8 flush with respect to the wall surface. The weld joint 8, as well as the wall 2, are provided with a bore 9, the diameter of the latter being larger than the outer diameter of the tuyere 3, thus providing a free guidance of the tuyere 3 through the wall 2. The bore in the wall 2 is understood to be a continuously extending bore through a web between two finned tubes and through the internal lining of the wall, consisting of a refractory tamping material. The pipe adapter 6 tapers in cross section in the zone of the weld joint 8 so that this adapter is smaller in diameter at the junction of the weld joint 8 than at the flange connection 5. The diameter of the pipe adapter thus is adapted, at the connection with the weld joint 8, to the size of this weld joint. The pipe connection 7 has the shape of a "T", one pipe opening of the T beam being located at the flange connection 5, the other pipe opening 10, lying in opposition to the tuyere 3 on the same axis 11, being closed off by a removable lid and/or blind flange 12. By taking off the lid 12, the possibility is provided of inspecting the tuyere 3 from the inside, if necessary, and optionally servicing the tuyere. The pipe section 13 of the pipe connection 7, extending from the axis 11 at an angle of 90°, leads to a sealable feed pipe 14 of a feed conduit for reducing agent.

I claim:

1. Tuyere for the introduction of a gaseous or liquid reaction medium into a hot gas in a space defined by walls, this tuyere being clamped in place at its inlet end by an integrally formed flange in a flange connection of a pipe adapter joined to the wall on the outside, the outlet end of the tuyere being extended freely through the wall into said space, the flange connection (5) being formed at the pipe adapter (6) with a pipe connection (7); the pipe adapter (6) being connected to the wall (2) by a weld joint (8) which is flush with the wall surface and which has a bore (9) traversed by the tuyere; the pipe adapter (6) being smaller in diameter at the connection with the weld joint (8) than at the flange connection (5).

2. Tuyere according to claim 1, in which the pipe connection (7) has the shape of a "T", one pipe opening of the "T" being located at the flange connection (5), the other pipe opening (10) which lies in opposition to the tuyere (3) on the same axis (11) being closed off by a removable cover (12), and the pipe section (13), extending away at an angle of 90° with respect to the axis (11), being connected to a feed conduit.

* * * * *